(12) United States Patent
Hahn et al.

(10) Patent No.: US 7,724,120 B2
(45) Date of Patent: May 25, 2010

(54) MAGNETIC POLE FOR MAGNETIC LEVITATION VEHICLES

(75) Inventors: Wolfgang Hahn, Kassel (DE); Harald Pfannkuch, Wabern (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 1001 days.

(21) Appl. No.: 10/584,898

(22) PCT Filed: Feb. 5, 2005

(86) PCT No.: PCT/DE2005/000219

§ 371 (c)(1),
(2), (4) Date: Jun. 28, 2006

(87) PCT Pub. No.: WO2005/087534

PCT Pub. Date: Sep. 22, 2005

(65) Prior Publication Data
US 2009/0021335 A1    Jan. 22, 2009

(30) Foreign Application Priority Data
Mar. 9, 2004    (DE) .................... 10 2004 011 942

(51) Int. Cl.
H01F 27/24    (2006.01)

(52) U.S. Cl. .................... 336/234; 336/187
(58) Field of Classification Search .............. 336/234
See application file for complete search history.

(56) References Cited

U.S. PATENT DOCUMENTS

| | | | | |
|---|---|---|---|---|
| 3,467,931 | A | * | 9/1969 | Dutton .................. 336/180 |
| 5,274,904 | A | * | 1/1994 | Proise .................. 29/602.1 |
| 5,530,308 | A | * | 6/1996 | Fanning et al. .......... 310/208 |
| 2001/0001895 | A1 | | 5/2001 | Setiabudi |

FOREIGN PATENT DOCUMENTS

| | | |
|---|---|---|
| DE | 24 42 388 | 3/1976 |
| JP | 06 290933 | 10/1994 |
| JP | 2004 040036 | 2/2004 |
| WO | 97/30504 | 8/1997 |

* cited by examiner

*Primary Examiner*—Elvin G Enad
*Assistant Examiner*—Joselito Baisa
(74) *Attorney, Agent, or Firm*—Michael J. Striker (57) ABSTRACT

A magnetic pole for magnetically levitation vehicles is described comprising a core and a winding applied on said core. According to the present invention, the winding has two spaced disks formed of conductor strip sections (21a, 21b) wound in opposite winding sense and in several layers around said core and conductively connected to each other at ends near said core by a connection section (21c) which defines the axial distance of said two disks (11, 12) and the winding sense of the two conductor strip sections (21a, 21b).

12 Claims, 6 Drawing Sheets

MAGNETIC POLE FOR MAGNETIC LEVITATION VEHICLES

The present invention relates to a magnetic pole according to the species designated in the preamble of Claim 1.

Magnetic poles of this type are used with magnetic levitation vehicles in various applications, e.g. as parts of carrier, guidance, or brake magnets. Up to now, these magnetic poles have been made of an iron core and a winding applied on it, said winding being formed of layers of a conductor and an isolator arranged in alternating succession (PCT WO 97/30 504). The conductors and isolators are comprised of band-shaped materials, e.g. aluminum bands and thin insulating foils.

Prior art magnetic poles are comprised of one disk each so that the number of layers is equal to the number of windings. If the number of windings is high, this arrangement involves a problem in cooling. If the core is to simultaneously act as a cooling element, the heat generated in each layer is also required to penetrate in radial direction through electrically desired, though thermally interfering insulation foils, the overall thermal resistance of which increases as the number of layers rises.

In a patent application filed in parallel by the same applicant, it is therefore proposed to provide the winding with at least two disks formed from conductor strips wound in several layers around the core, and to electrically insulate the individual layers radially against each other, while electrically insulating the two disks axially against each other. Moreover, it is proposed there to wind the conductor strips in opposite winding sense around the core and to connect them electrically with each other at the core. The advantage thus obtained is that the magnetic pole need not be provided with electrical connections passed through to the interior and ending between the core and the first layer. However, the question not yet solved is how to cost-effectively connect the two layers near the core by the aid of electrical connectors without causing sharp edges and corners that might entail insulation breakthroughs due to point discharges. It would be possible to provide a sufficiently thick insulation layer between the core and each first layer of the two disks that would electrically shield the core usually lying on mass potential against these first layers and the connectors provided there. This it would, however, entail the disadvantage that the thermal conductivity in radial direction would be noticeably deteriorated in this area, thus affecting the discharge of heat energy generated in the winding via the core which also acts as a cooling element and consequently affects the cooling efficiency, too.

Now, therefore, it is the object of the present invention to so design the magnetic pole of the species described hereinabove that it can be produced cost-effectively and operated without expensive insulation measures for counteracting interfering field intensity concentration.

The characterizing features of Claim 1 serve to solve this object.

The present invention bears the advantage that the winding for both disks can be manufactured from a completely pre-fabricated conductor strip that already contains the electrical connector section. The axial distance between these two disks as desired in a given case is defined by the geometry of the connector section. The same applies to the opposite winding sense of the two adjacent conductor strip sections, thus preventing virtually any fault in applying the winding.

Other advantageous features of the present invention become evident from the subclaims.

Embodiments of the present invention will be explained in more detail and based upon the drawings attached hereto, in which.

Figure 1:
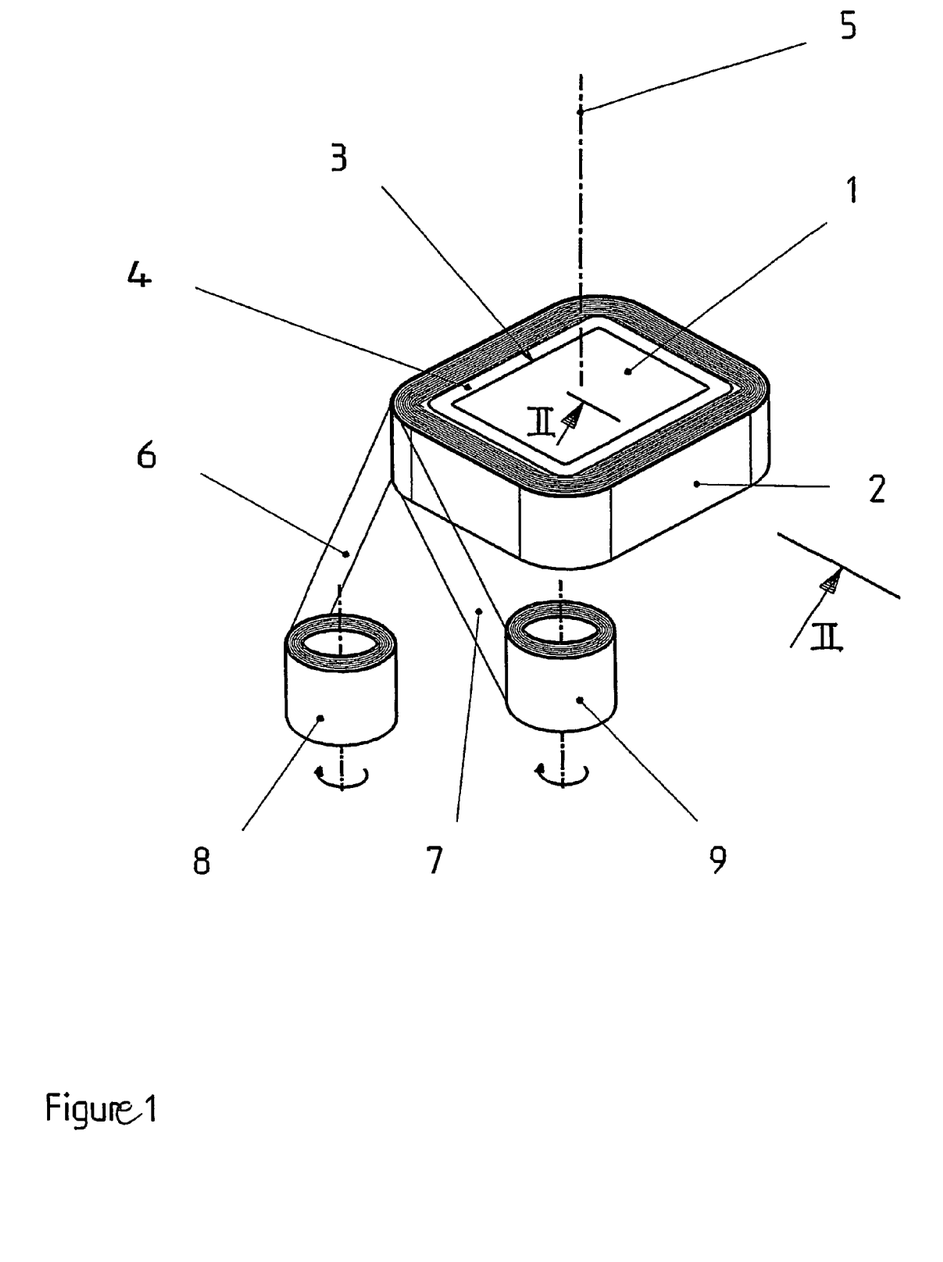
FIG. 1 shows a perspective view of applying a winding on a conventional magnetic pole comprised of a mono-disk winding.

A magnetic pole of the type being of interest hereunder according to FIG. 1 is comprised of an iron core 1 consisting of a metal sheet pack, preferably square-shaped, with rounded-off corners and a winding 2 applied on it. The production of core 1 can be done in many different ways and is of no importance for the present invention. Moreover, said core 1 can be provided with a circumferential insulation layer 3 lying against a shell surface, which insulation layer is comprised of an insulating material, e.g. made of plastic, and which may also be configured as a winding carrier, which is provided with assembly flanges 4 in between of which winding 2 comes to lie. The insulation layer 3 serves for both assembly of said winding 2 and electrical insulation of winding 2 towards said core 1 in radial direction relative to a center and coiling axis 5 of said core 1.

For example, the winding 2 is formed by layers of a conductor strip 6 (e.g. made of aluminum) being arranged in alternating succession with insulation layers 7 arranged between them in the form of an insulating foil or the like which electrically insulates these layers against each other in radial direction. In manufacturing the magnetic pole, the conductor strips 6 and the insulation layers 7 are reeled-off in a well-known manner from supply coils 8, 9, and wound coaxially around the center axis 5 onto said core 1. Henceforth, the winding 2 thus obtained is comprised of a disk running coaxially to the center axis 5 and having a plurality of layers in radial direction.

Magnetic poles of the type described hereunder for magnetic levitation vehicles are e.g. comprised of up to 300 layers. Therefore, the heat generated in operation, inasmuch as it is generated in a central layer, e.g. in layer 150 of winding 2, must penetrate in radial direction both towards the core 1 and radially towards the outside through a plurality of e.g. 150 insulation layers each that must have a certain minimum thickness to ensure electrical insulation. Heat discharge and, thereby, the cooling efficiency in radial direction, therefore, notably depends on the number of existing layers 1 . . . 300.

Figure 2:
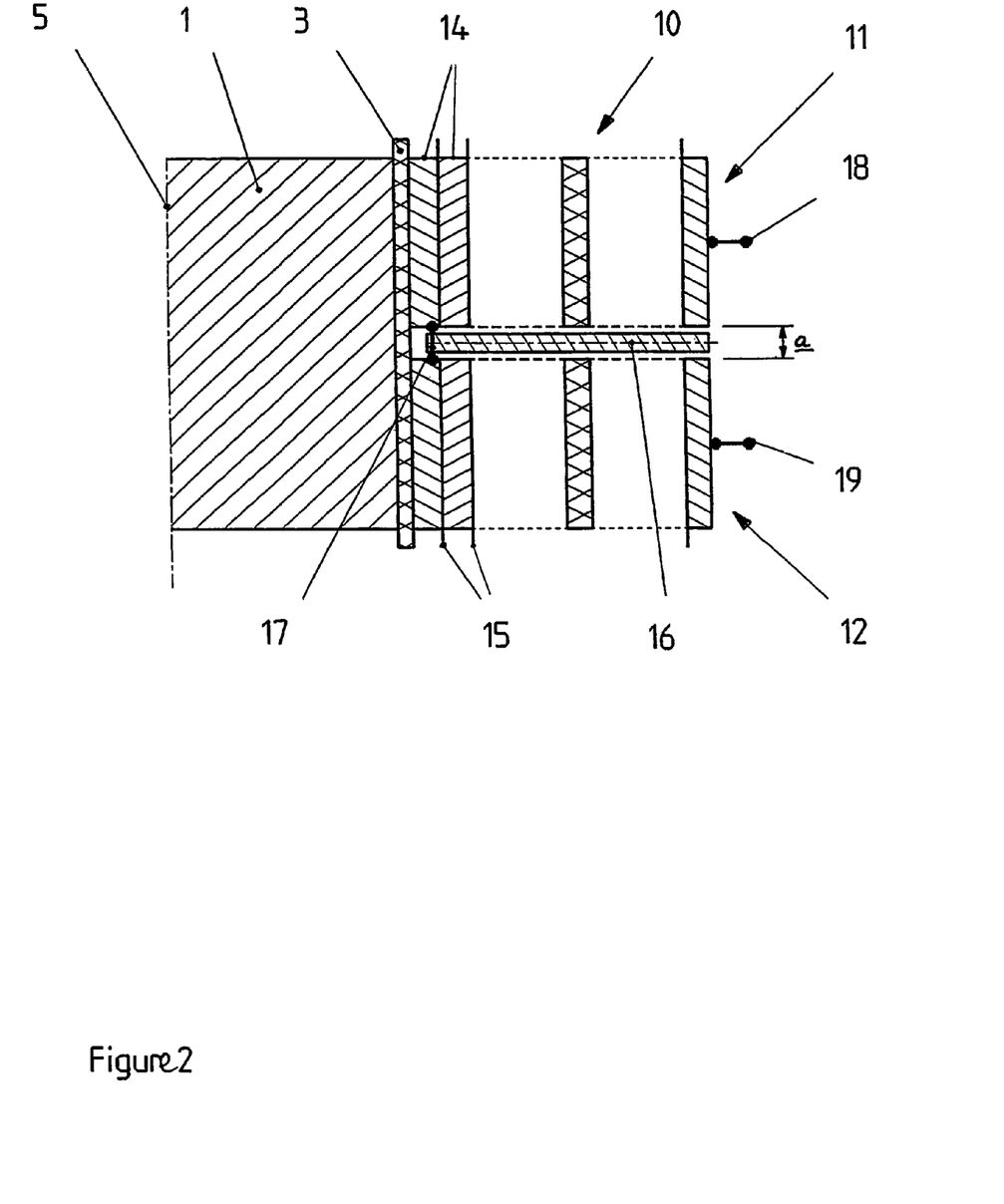
FIG. 2 shows a schematic section along line II-II of FIG. 1 through half of a magnetic pole configured according to the present invention, but provided with a winding comprised of two disks.

According to the present invention, it is therefore proposed to distribute the layers of one winding 10 (FIG. 2) onto two disks 11 and 12 lying one above the other in axial direction. It is particularly advantageous for both disks 11, 12 to have substantially the same number of layers and/or windings. As shown in FIG. 2, this is realized in that disk 11, for example, has layers 1 to 150, and in that disk 12 has layers 151 to 300, with the individual layers being indicated by reference number 14 and the insulation layers lying thereinbetween being indicated by reference number 15. In terms of magnetic force, the same magnetic flux is achieved with the same electric current as if a mono-disk winding having the same number of windings is used. To ensure that also the cross-sectional areas of the individual layers, which are decisive for dissipation, are the same as those with a mono-disk winding 2 according to FIG. 1, without it being required to enhance the height of the magnetic pole measured in axial direction, said layers 14 shown in FIG. 2 are half as high and twice as thick as those shown in FIG. 1. Finally, at least a second insulation layer 16 is provided for in FIG. 2, which is arranged between the two disks 11, 12 and which electrically insulates them against each other in axial direction.

As compared with the other disk 12, layers 14 in disk 11 are preferably wound in opposite winding sense around said core 1. Thus it is possible to electrically connect the two layers lying inside at the core 1 by a connection line 17 with each other and to provide the two layers 14 lying radially farthest outside with an electrical connection 18, 19 each, one connection thereof serving as lead-in line and the other one serving as a lead-out line for the electrical current flowing through winding 10, so that the individual layers 14 are consecutively flown through by electrical current if a terminal voltage is applied between connections 18, 19.

For ease of manufacture and installation and to avoid harmful compaction of the electrical field strength in the area of the connection line 17 due to sharp edges or corners, the two winding sections located in the disks 11 and 12 according to the present invention are formed by a conductor strip 21 (FIG. 3, 4) which contains two conductor strip sections 21a and 21b and a connecting section 21c lying between the former sections and conductively connecting those ends of the conductor strip sections 21a, 21b that come to lie near the core 1 (FIG. 2) when installed. The conductor strip 21 expediently has the same width b over its entire length. The connection section 21c expediently consists of the same material (e.g. aluminum) as each conductor strip section 21a and 21b, respectively. Furthermore, the connection section 21c is so configured that it determines both a distance a (FIG. 2) of the two disks 11, 12 in the installed status and the winding sense of conductor sections 21a, 21b in disks 11, 12 during installation. These determinations are obtained by folding the conductor strip 21 as described hereinafter.

Figure 3:
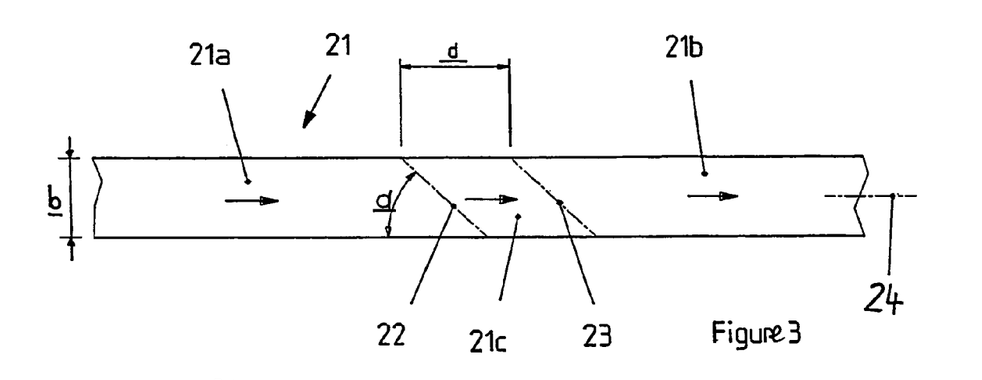
FIG. 3 represents a top view on a first embodiment of a conductor strip configured according to the present invention in a non-folded status.

In accordance with FIG. 3, the conductor strip 21 is comprised of two folding lines 22 and 23 imaginated or traced by a dashed line in FIG. 3. Both folding lines 22, 23 run at an angle a ranging between 30θ and 60θ and preferably amounting to 45θ obliquely to a longitudinal axis 24 of conductor strip 21. The two folding lines 22, 23 simultaneously delimitate the connection section 21c of conductor strip 21.

The conductor strip 21 is folded prior to installation. For example, to this effect, the connecting section 21c together with the adjacent conductor strip section 21b is initially folded by 180θ around folding line 22, e.g. upwardly from the drawing plane. The conductor strip section 21b thereby comes to rest vertically to conductor strip section 21a, with its underside now pointing upwardly in contrast with FIG. 3. In a second step, only conductor strip section 21b is then folded by 180θ around the second folding line 23, i.e. again upwardly from the drawing plane. Subsequently the conductor strip section 21b takes the position visible from FIG. 4 in which the side lying on top in FIG. 3 again lies on top. At the same time, it becomes evident from FIG. 4 that the two conductor strip sections 21a, 21b lie in parallel to each other after folding, but have a certain distance c to each other. With a folding angle a of 45θ, this distance results from the difference between a distance d of the two folding lines 22, 23 in parallel to the longitudinal axis 24 (FIG. 3) and the width b of the conductor strip 21. The larger (smaller) this difference, the larger (smaller) is the distance c. It is self-evident that the measure d is chosen so much greater than measure b that the difference d minus b is exactly equal to the distance designated a in FIG. 2 between the two disks 11, 12 to be manufactured. With folding lines inclined by folding angles a deviating from 45θ, similar considerations lead to the required measure a in FIG. 2.

In applying the winding of core 1, the connection section 21c of a conductor strip 21 cut to the required length is laid with its top or bottom side onto the shell surface of core 1 and/or insulation layer 3. Subsequently the conductor strip section 21a is coiled in the one winding sense resulting hereof, while conductor strip section 21b is coiled in the opposite winding sense around core 1. Both the measure c and the winding sense are invariably defined by the geometry of the connection section 21c. The direction of an electrical current resulting hereof, e.g. fed via connection 18 (FIG. 2) is indicated by arrows in FIGS. 3 and 4, thus making it evident that the magnetic fluxes generated by the electrical current in both disks 11, 12 add-up each other.

Figure 4:
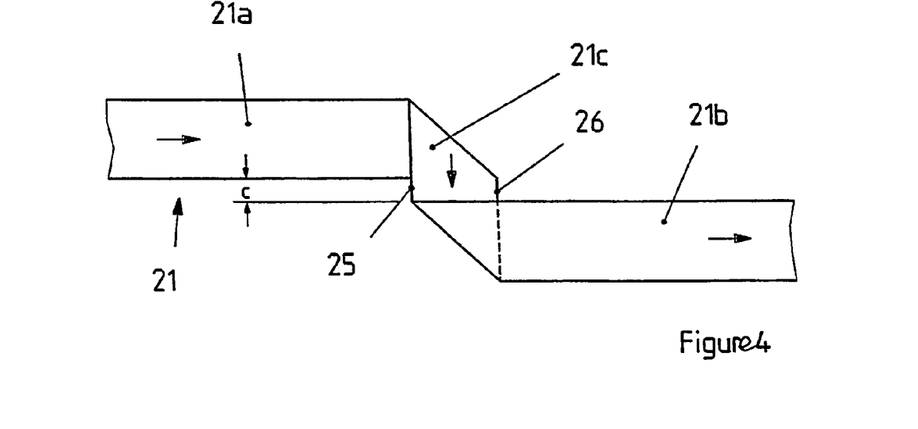
FIG. 4 represents a top view on the conductor strip according to FIG. 3, but in a status folded in accordance with the present invention.

Taking the embodiment according to FIGS. 3 and 4, it might result a disadvantage in that lateral edges 25, 26 of the connection section 21c which come to rest immediately at the core 1 might cause interfering field intensity concentrations (point discharges), because these lateral edges 25, 26 after installation lie free between the two disks 11, 12 and because the distance a cannot be minimized at will due to the required disk insulation layer 16 (FIG. 2).

Figure 5:
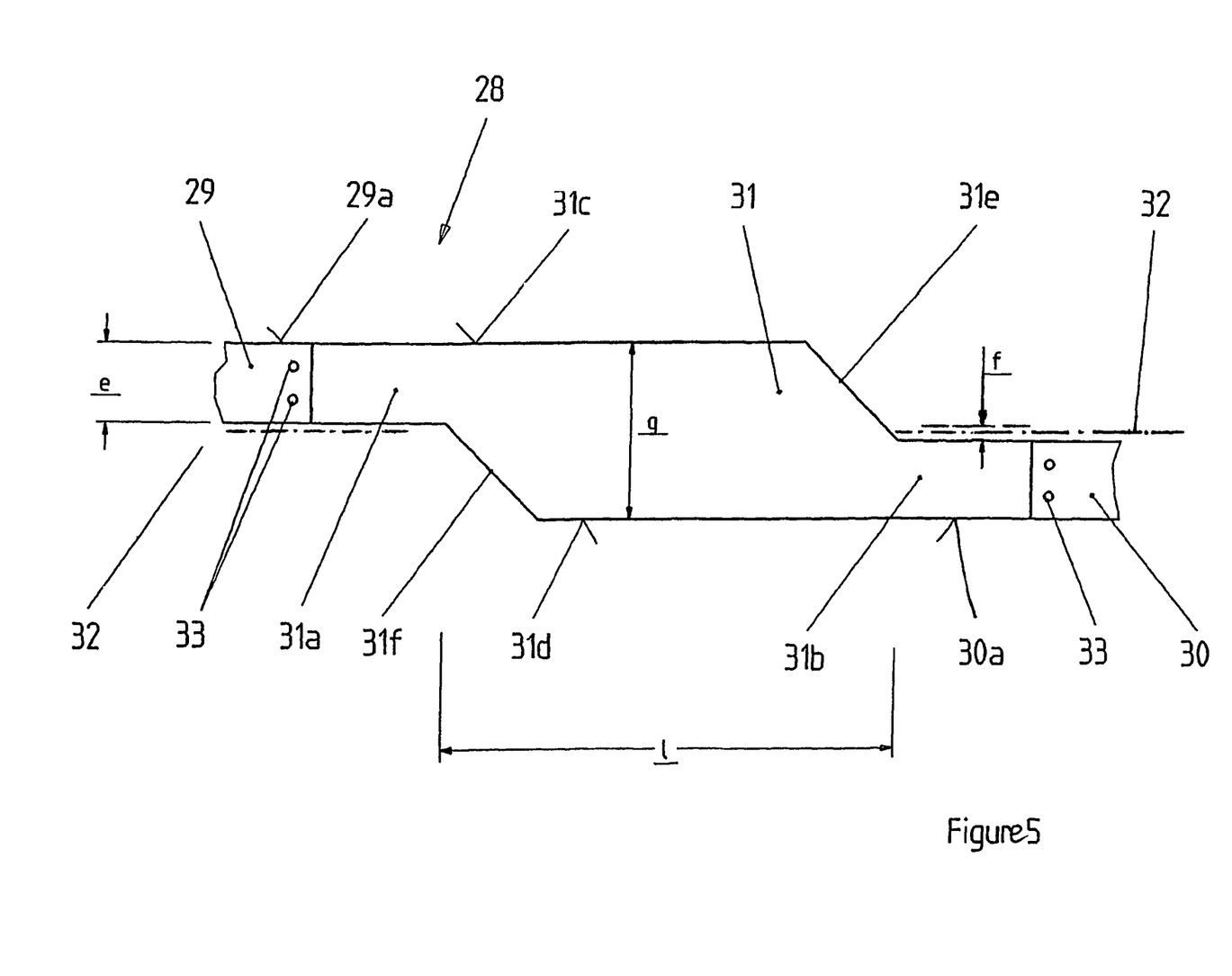
FIG. 5 represents a top view on a middle section of a second embodiment of the conductor strip configured according to the present invention.
Figure 6:
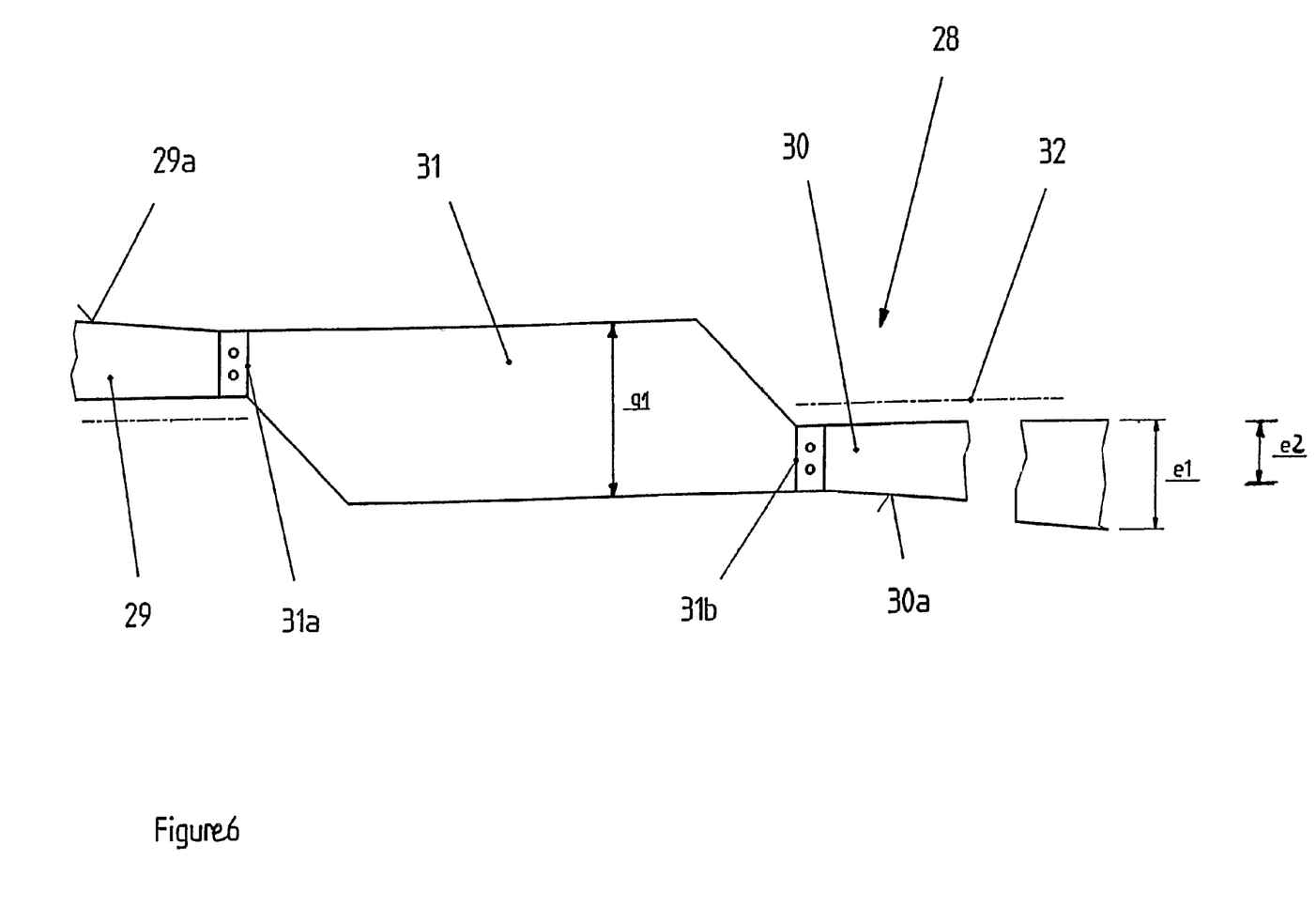
FIG. 6 represents a top view on a conductor strip substantially corresponding to the one shown in FIG. 5, which however is provided with particular, tailor-cut conductor strip sections.
Figure 7:
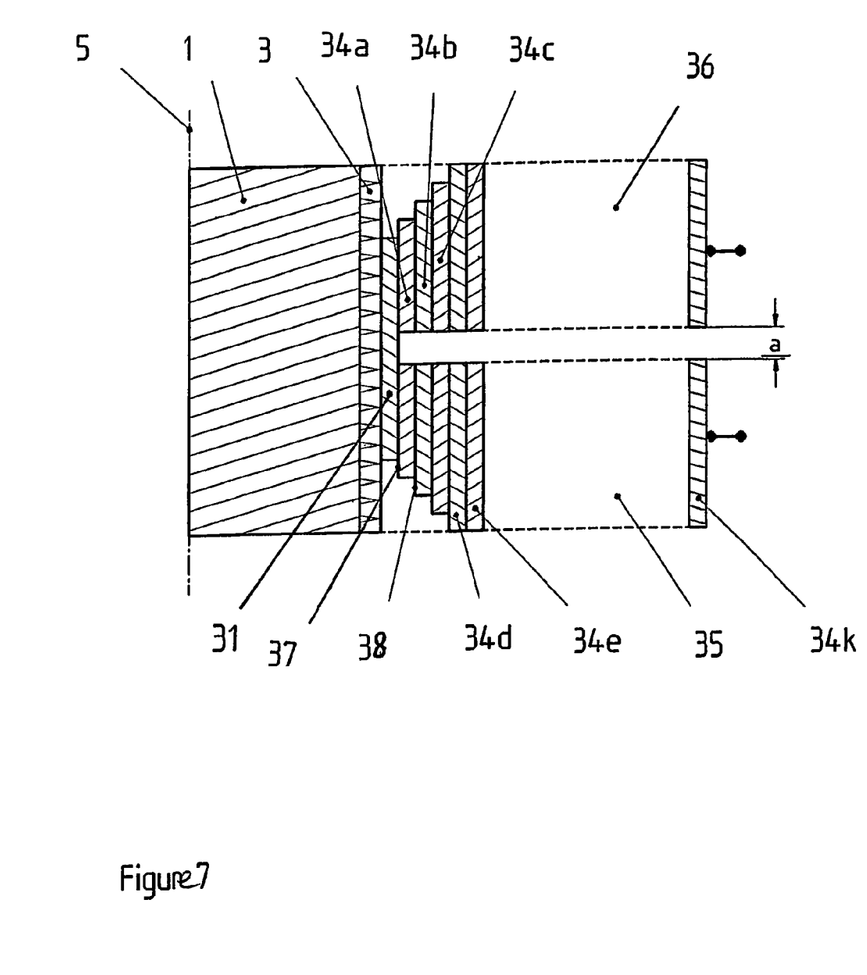
FIG. 7 shows a sectional view corresponding to FIG. 2 of the magnetic pole if a conductor strip according to FIG. 6 is applied.

According to the present invention, the problem evidenced by FIGS. 3 and 4 is remedied by the embodiment according to FIGS. 5 to 7. In accordance with FIG. 5, a conductor strip 28 analogously to FIGS. 3 and 4 is comprised of two conductor strip sections 29, 30 and a connection section 31 lying thereinbetween, electrically connecting the two conductor strip sections 29, 30 and preferably being made of the same material as the latter sections. In contrast with FIGS. 3 and 4, the conductor strip sections 29, 30 serving for establishing the winding 10 (FIG. 2) are made of separate strips which in parallel to a longitudinal axis 32 entirely have the same width e. The connection section 31 is comprised of a planar formed part also manufactured separately, e.g. by punching and has two connection terminals 31a, 31b being arranged at a certain spacing in the direction of the longitudinal axis 32 and connected by welding or otherwise, as indicated by points 33, firmly with the conductor strip sections 29, 30. The connection terminals 31a, 31b expediently also have the width e and are vertically spaced to the longitudinal axis by a certain space f which corresponds to the measure a of FIG. 2. Between the two connecting terminals 31a, 31b the connection section has two longitudinal rims 31c, 31d running in parallel to the longitudinal axis 32, which rims are spaced by a measure g which corresponds to the sum of twice the width e and the measure f. Accordingly, the longitudinal rim 31c passes flush into an outer edge of the one connecting terminal 31a and into an outer edge 29a of the conductor strip section 29 linked to it, while the other longitudinal rim 31d passes flush into an opposite outer edge of the other connecting terminal 31b and an outer edge 30a of the conductor strip section 30 linked to it.

The installation of the conductor strip 28 of FIG. 5 is executed analogously to the installation of conductor strip 21 according to FIGS. 3 and 4, whereas the folding procedure can be omitted because of the formed part 31. After the connection section 31, whose measure g basically corresponds to the height of core 1, has been laid on this core, the end sections 31a, 31b and together with them the conductor strip sections 29, 30 are coiled around core 1 in one winding sense and/or the other one, again starting from a prepared conductor strip 28 cut to length. The distance a of the disks 11, 12 thus formed (FIG. 2) then automatically corresponds to measure f and the opposite winding sense, too, is invariably defined by the connection section 31. Moreover, a length l of the connection section 31 is expediently so chosen that the connection section 31 forms the first full layer coiled immediately on core 1 and/or insulation layer 3. In this case, the edges 31e and 31f which lie in the transitional areas between the connecting terminals 31a, 31b and the middle piece of connection section 31 having the width g, preferably abut against each other after installation, preferably by slight overlap enabled by a slot in one of the edges. As a result hereof, the free-lying lateral edges 25 and 26 evident from FIG. 4 are missing and a slot existing between the two disks 11, 12 is completely covered towards core 1 by the connection section 31.

Another improvement in the insulating properties is achieved by the embodiment shown in FIGS. 6 and 7 which basically corresponds to the embodiment according to FIG. 5. In contrast therewith, the conductor strip sections 29, 30 are so configured that their outer edges 29a, 30a run obliquely with respect to the longitudinal axis 32 towards the outside in an area bordering the connection section 31. For this purpose, a measure g1 of the connection section 31 which corresponds to the measure g in FIG. 5 is chosen somewhat smaller than corresponds to the height of core 1. On the other hand, the conductor strip sections 29, 30 at the outer longitudinal rims 29a, 30a are expediently cut properly so that their width (measure e in FIG. 5) continuously increases, starting from the connection section 31, in the longitudinal direction (axis 32) up to a maximum value e1 (FIG. 6), with it being possible for this increase to run alongside a straight or curved line. The maximum value e1, viewed in longitudinal direction, is reached after a length that corresponds to a number of layers which is smaller than the total number of layers of the pertaining disk. For example, the maximum value e1 is reached after a length of the relevant conductor strip section 29, 30 that corresponds to roughly ten layers. The longitudinal edges 29a, 30a are cut preferably symmetrically to the longitudinal axis 32 which runs vertically to the center axis 5 (FIG. 2), but with some offset in the direction of the axis 32 which becomes evident from FIG. 6. At its ends connected with the connecting terminals 31a, 31b the conductor strip sections 29, 30 therefore have a width e2 which is accordingly reduced as compared with measure e1 (FIG. 6).

The procedure of cutting the lateral rims 29a, 30a as described hereinabove involves that layers 34a, 34b ... 34k of two windings 35 and 36 formed with them as shown in FIG. 7, not depicting insulation layers located there in between, attain a gradually increasing height. The slope of the longitudinal edges 29a, 30a is advantageously so chosen that only corners and/or sharp edges of the first layers 34a, 34b (e.g. 37, 38 in FIG. 7) being already covered in a planar manner by the following layer face to the said core 1. For example, edge 37 of layer 34a is covered by layer 34b, edge 38 of layer 34b is covered by layer 34c, etc., whereby harmful point discharges are largely avoided. This is particularly applicable if considering the circumstance that the conductor strips 29, 30 are comparatively thin (e.g. 0.2 mm) and therefore the field intensity concentration with plate/tip combinations occurring here are at least three times as big as those in a plate/plate combination. Moreover, by way of the configuration of the tailored cuts as described hereinabove it can be assured that the smallest width e2 of the conductor strip sections 29, 30 is only so much smaller than the maximum width e1 at a place where it is linked to the connecting terminals 31a, 31b as is required to ensure that the associated increase in ohmic resistance does not entail any significant disadvantages with regard to the of heat loss dissipation via core 1 in radial direction.

Besides, FIG. 7 shows that the maximum width e1 of the conductor strip sections 29, 30 in the embodiment is roughly reached at the fourth layer 34d.

Other advantages of the present invention lie in the fact that by avoidance of insulation breakthroughs a higher operational safety, a reduction in ageing effects, and an enhancement in nominal values for corona and partial discharges are obtained. It is perfectly clear insofar that the geometry of the step formation being evident from FIG. 6 and FIG. 7 in the area of the first layers 34a, 34b} ... in principle can be chosen at will and can largely be adapted to the magnetic requirements. Furthermore, it is possible to provide a continuous, partially conductive foil not shown and extending over the height of core 1 between the insulation layer 3 of said core 1 and the first layer 34a, said foil, for example, being comprised of an organic insulation substance mixed with carbon black and suitable for dissipating capacitive currents while not allowing operating currents to pass through. After applying the winding of core 1, the foil can be laid against the edges and corners 37, 38, (FIG. 7) etc. in order to thus obtain a rounding-off and homogenization of the stepped areas near said core 1 and to further reduce the risk of point discharges.

The present invention is not limited to the embodiments described herein that can be varied in a plurality of ways. In particular, this applies to the shape of the folding according to FIGS. 3 and 4 chosen in a given case and/or to the configuration of the connection sections and/or formed parts 31 as shown in FIGS. 5 and 6. Moreover, it is possible to configure the magnetic pole in an analogous configuration from four, six, or more disks lying one above the other in the direction of the center axis 5. Finally, it is considered self-evident that the different characterizing features can also be applied in combinations other than those shown and described.

The invention claimed is:

1. A magnetic pole for magnetic levitation vehicles, comprising:
 a core (1) having a center axis (5); and
 a winding (10, 35, 36) applied on said core (1), characterized in that said winding (10, 35, 36) has two disks (11, 12) adjacent to each other in the direction of the center axis (5), said disks being formed of conductor strip sections (21a, 21b, 29, 30) coiled in several layers coaxially around the center axis (5) onto said core (1) and having a plurality of layers (14) in a radial direction of the center axis (5), the conductor strip section (21a, 29) coiled in a first winding sense, the conductor strip section (21b, 30) coiled in a second winding sense being opposite the first winding sense, each disc (11, 12) having an outside layer being radially farthest from the core (1) and an inside layer being near the core (1), the two inside layers of the two disks (11, 12) being conductively connected by a connection section (21c, 31, 17), the two outside layers provided each with an electrical connection (18, 19), the connection section (21c, 31) determining the winding senses of the two conductor strip sections (21*a*, 21*b*, 29, 30) and an axial distance (a) between the two disks (11, 12).

2. A magnetic pole according to claim 1, characterized in that said winding (10) is made of a continuous, one piece conductor strip (21) basically having the same width (b) throughout, wherein the axial distance (a) of the two disks (11, 12) is defined by folding in the area of the connection section (21*c*).

3. A magnetic pole according to claim 2, characterized in that the conductor strip (21) is folded along two folding lines (22, 23) which are arranged in parallel to each other and obliquely to a longitudinal axis (24) of the conductor strip (21).

4. A magnetic pole according to claim 1, characterized in that said winding (35, 36) is made of a continuous conductor strip (28) in which the connection section (31) is configured as a planar formed part which has two connecting terminals (31*a*, 31*b*) that define the axial distance (a) of the two disks and are connected to one conductor strip section (29, 30) each.

5. A magnetic pole according to claim 4, characterized in that the two conductor strips (29, 30) are connected by welding to the connection section (31).

6. A magnetic pole according to claim 1, characterized in that at least one conductor strip section (29, 30) is properly cut at one outer longitudinal rim (29*a*, 30*a*) so that its width (e) continuously increases from the connection section (31) in longitudinal direction up to a maximum value (e1).

7. A magnetic pole according claim 6, characterized in that the maximum value (e1) of width, viewed in longitudinal direction, is reached after a length that corresponds to a number of layers (34) which is smaller than the total number of layers (34) of the pertaining disk.

8. A magnetic pole according to claim 7 characterized in that the maximum value (e1) of the width is reached after a length of the conductor strip (29, 30) that corresponds to approximately ten layers (34).

9. A magnetic pole according to claim 6, characterized in that the longitudinal rims (29*a*, 30*a*) of conductor strip sections (29, 30) are symmetrically tailor-cut with respect to a longitudinal axis (32) extending vertically to the center axis (5) of said conductor strip (28), but with some offset formed by the connection section (31).

10. A magnetic pole according to claim 6, characterized in that the longitudinal rims (29*a*, 30*a*) are tailor-cut along straight lines or continuous curves.

11. A magnetic pole according to claim 4, characterized in that the connection section (31) is so configured that it forms the first layer of the two disks wound around said core (1) and covers a slot formed by the distance (a) of the two disks.

12. A magnetic pole according to any claim 1, characterized in that said core (1) at its shell surface is wrapped by an insulation layer (3) and that a partially conductive foil is located between said insulation layer (3) and the layer (14, 34*a*) of said disk (11, 12) bordering it, said conductive foil resting against steps formed by tailor-cutting of said conductor strip (21, 28).

* * * * *